US012777449B2

(12) United States Patent
Lee et al.

(10) Patent No.: US 12,777,449 B2
(45) Date of Patent: Oct. 27, 2026

(54) NETWORK DEVICE, AND METHOD BY WHICH DEVICE TRANSMITS TERMINAL LOCATION INFORMATION

(71) Applicant: SK TELECOM CO., LTD., Seoul (KR)

(72) Inventors: Dong Jin Lee, Seoul (KR); Seong Jun Lee, Seoul (KR); Hyun Jun Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 568 days.

(21) Appl. No.: 18/021,831

(22) PCT Filed: Aug. 24, 2021

(86) PCT No.: PCT/KR2021/011299

§ 371 (c)(1),
(2) Date: Feb. 17, 2023

(87) PCT Pub. No.: WO2022/045735

PCT Pub. Date: Mar. 3, 2022

(65) Prior Publication Data

US 2025/0287334 A1 Sep. 11, 2025

(30) Foreign Application Priority Data

Aug. 24, 2020 (KR) ........................ 10-2020-0106485

(51) Int. Cl.
*H04W 64/00* (2009.01)
*H04W 28/02* (2009.01)

(52) U.S. Cl.
CPC ....... *H04W 64/00* (2013.01); *H04W 28/0226* (2013.01)

(58) Field of Classification Search
CPC ....... H04W 48/18; H04W 48/16; H04W 8/08; H04W 76/10; H04W 36/0022; H04W 64/00; H04W 28/0226
See application file for complete search history.

(56) References Cited

U.S. PATENT DOCUMENTS 10,051,512 B2 * 8/2018 Jeong ................ H04W 28/0289
11,310,868 B2 * 4/2022 Myhre .................... H04L 41/12
(Continued)

FOREIGN PATENT DOCUMENTS

CN 110547003 A 12/2019
CN 110741658 A 1/2020
(Continued)

OTHER PUBLICATIONS

International Search Report dated Nov. 19, 2021 issued in Application No. PCT/KR2021/011299.
(Continued)

*Primary Examiner* — Dung Hong
(74) *Attorney, Agent, or Firm* — BROADVIEW IP LAW, PC

(57) ABSTRACT

The present disclosure proposes a device and a method for realizing a differentiated technology that enables UPF to differentiate and process session traffic, based on information provision between a control plane and a user plane, when processing the session traffic.

12 Claims, 7 Drawing Sheets

(56) References Cited

U.S. PATENT DOCUMENTS

| | | | | |
|---|---|---|---|---|
| 11,700,284 | B2 * | 7/2023 | Zhang | H04L 65/1026 370/401 |
| 11,729,586 | B2 * | 8/2023 | Livanos | H04W 4/08 370/312 |
| 2006/0245406 | A1 * | 11/2006 | Shim | H04L 63/08 370/338 |
| 2010/0240392 | A1 * | 9/2010 | Gerstenberger | G01S 5/12 455/456.1 |
| 2010/0265093 | A1 * | 10/2010 | Cho | G01S 5/02528 340/8.1 |
| 2011/0143774 | A1 * | 6/2011 | McNamara | H04W 4/14 455/456.2 |
| 2017/0142683 | A1 * | 5/2017 | Wu | H04W 64/003 |
| 2018/0317157 | A1 * | 11/2018 | Baek | H04W 40/20 |
| 2019/0053117 | A1 | 2/2019 | Bae et al. | |
| 2019/0182875 | A1 * | 6/2019 | Talebi Fard | H04W 24/02 |
| 2019/0223134 | A1 * | 7/2019 | Park | H04W 76/34 |
| 2019/0254083 | A1 * | 8/2019 | Stammers | H04W 8/02 |
| 2020/0008126 | A1 * | 1/2020 | Long | H04W 4/021 |
| 2020/0059525 | A1 * | 2/2020 | Zhu | H04L 67/563 |
| 2020/0092423 | A1 * | 3/2020 | Qiao | H04M 15/66 |
| 2020/0100095 | A1 * | 3/2020 | Tang | H04W 8/12 |
| 2020/0100205 | A1 * | 3/2020 | Dodd-Noble | H04L 43/062 |
| 2021/0144619 | A1 * | 5/2021 | Prakash | H04W 48/08 |
| 2021/0258868 | A1 * | 8/2021 | Wong | H04L 67/00 |
| 2021/0320844 | A1 * | 10/2021 | Kumar | G06F 9/45558 |

FOREIGN PATENT DOCUMENTS

| | | | | |
|---|---|---|---|---|
| KR | 10-2019-0117747 | | 10/2019 | |
| KR | 10-2020-0030242 | A | 3/2020 | |
| KR | 10-2020-0047108 | | 5/2020 | |
| KR | 20200047108 | A * | 5/2020 | H04L 67/327 |
| WO | 2019/103462 | A1 | 5/2019 | |
| WO | WO 2019/174735 | | 9/2019 | |
| WO | 2019/210947 | A1 | 11/2019 | |
| WO | WO 2020/085964 | | 4/2020 | |

OTHER PUBLICATIONS

Office Action for CN 202180052309.3 by China National Intellectual Property Administration dated Mar. 23, 2026.

Motorola Mobility et al., "MA PDU session is not supported," 3GPP TSG-CT1 Meeting #122-e, C1-201044, Feb. 2020.

* cited by examiner

FIG. 5

| Location Information | | | | | | | | | |
|---|---|---|---|---|---|---|---|---|---|
| PDU Session ID | Application ID / Name | Slice (SST/SD) | DNN | PDR, QER, FAR, URR | NCGI | ECGI | Freq / Band | GPS (latitude, longitude) | Time |
| 0x42D1 | 0x133 / 'ABC' | URLLC | "biz1" | ... | ... | ... | ... | ... | ... |
| | 0x4AA / 'DEF' | mMTC | "biz1" | ... | ... | ... | ... | ... | ... |
| 0x19AA | 0x29D / 'GHI' | ... | "sos" | ... | ... | ... | ... | ... | ... |
| | | | | | | | | | |

FIG. 6

| Octets | Bits 8 | 7 | 6 | 5 | 4 | 3 | 2 | 1 |
|---|---|---|---|---|---|---|---|---|
| 1 | Type = XX (decimal) | | | | | | | |
| 2 to 3 | Length = n | | | | | | | |
| 4 | Spare | | | | Instance | | | |
| 5 | BAND | FRQ | UE RC | TIME | GPS | TAI | NCGI | ECGI |
| 6 | Spare | | | | | | SLICE | |
| a to (a+n1) | ECGI | | | | | | | |
| b to (b+n2) | NCGI | | | | | | | |
| c to (c+n3) | TAI | | | | | | | |
| d to (d+n4) | GPS | | | | | | | |
| e to (e+n5) | TIME | | | | | | | |
| f to (f+n6) | UE Radio Capability | | | | | | | |
| g to (g+n7) | Frequency | | | | | | | |
| h to (h+n8) | Bandwidth | | | | | | | |
| i to (i+n9) | Network Slice(NSSAI) | | | | | | | |
| h to (n+4) | These octet(s) is/are present only if explicitly specified | | | | | | | |

NETWORK DEVICE, AND METHOD BY WHICH DEVICE TRANSMITS TERMINAL LOCATION INFORMATION

CROSS-REFERENCE TO RELATED PATENT APPLICATIONS

This application is a U.S. National Stage Application under 35 U.S.C. § 371 of PCT Application No. PCT/KR2021/011299, filed Aug. 24, 2021, which claims priority to Korean Patent Application No. 10-2020-0106485, filed Aug. 24, 2020, whose entire disclosures are hereby incorporated by reference.

TECHNICAL FIELD

The present disclosure relates to a technology for providing information between a control plane and a user plane.

BACKGROUND ART

In 5G, a network architecture is defined to support a terminal, a base station (access), a core, and a server end to end.

Thus, in 5G, the network architecture defines that a control signaling function plane (a control plane) and a data transmission/reception function plane (a user plane) are to be separated, which were complexly performed by a single node (e.g., S-GW, P-GW, etc.) in existing LTE (4G).

In 5G, a control node of the control plane may be defined as Access and Mobility Management Function (AMF) of controlling radio section access of a terminal, Policy Control Function (PCF) of managing/controlling policies such as terminal information, subscription service information for each terminal, and charging, Session Management Function (SMF) of managing/controlling a session for data service use for each terminal, Network Exposure Function (NEF) responsible of a function of sharing information with external networks, Unified Data Management/Authentication Function (UDM/AUSF) of managing/controlling a user's subscriber DB and authentication, NF Repository Function (NRF) of managing/controlling an NF repository function, Charging Function (CHF) of handling charging on a subscriber, etc.

In 5G, a data node of the user plane may be defined as a User Plane Function (UPF) of transmitting/receiving data between a terminal and a server on an external service network (e.g., Internet) through a session with the terminal, based on the control (interworking) of the SMF.

Recently, with the activation of B2B-type/Smart Factory, each of gNB (CU) and UPF is gradually being implemented in an independent type. Due to this, it is expected that the UPF (independent type) implemented independently is to be required to differentiate and process the traffic, when processing session data of a customer (a terminal).

According to the current standard, session information provided by the SMF to the UPF is very limited.

For this reason, according to the current standard, there is no information to be used to differentiate traffic in the independent-type UPF which is implemented independently, and thus it may be impossible to differentiate/process traffic when processing session traffic.

DISCLOSURE

Technical Problem

An aspect to be achieved by the present disclosure is to provide a technology for providing information between a control plane and a user plane and enabling UPF to differentiate and process session traffic when processing the session traffic, in consideration of an independent-type UPF implementation environment.

Technical Solution

A network device according to an embodiment of the present disclosure may include: a confirmation unit configured to confirm location information of a specific terminal; and an information providing unit configured to provide the location information of the specific terminal to a network node of a user plane involved in a session of the specific terminal so that the network node is capable of using the location information when processing traffic of the session.

Specifically, the location information may include, as area information about an access location of the specific terminal, at least one of Tracking Area Identity (TAI), NR Cell Global Identifier (NCGI), E-UTRAN CGI (ECGI), GPS-based location, and access time information.

Specifically, the location information may include, as radio information about an access frequency of the specific terminal, at least one of UE Radio Capability (UE RC), frequency information, band information, and network slice (NW Slice) information.

Specifically, the information providing unit may provide the location information of the specific terminal by including the location information in a session message that transmits a rule regarding the session of the specific terminal to the network node.

Specifically, the network device may be a network node having an interface configured to support direct signaling to the network node in a control plane, and the information providing unit may selectively provide the location information of the specific terminal according to a specific condition in consideration of the signaling state of the interface.

Specifically, the confirmation unit may confirm, based on at least one of a condition from another network node of a control plane and a state of the terminal, the location information with respect to a specific terminal satisfying a preconfigured information providing condition.

A network device according to an embodiment of the present disclosure includes: a confirmation unit configured to confirm location information of a specific terminal provided from a network node of a control plane; and a controller configured to perform traffic control using the location information when processing traffic of a session of the specific terminal.

Specifically, the location information may include radio information about an access frequency of the specific terminal and area information about an access location of the specific terminal, and when processing traffic of the session of the specific terminal, the controller may perform, based on at least one of the radio information and the area information, at least one among resource allocation scheduling, processing control, QoS control, and charging control in relation to packet processing of the traffic.

A terminal location information transmission method performed in a network device of a control plane according to an embodiment of the present disclosure includes: a confirmation operation of confirming location information of a specific terminal; and an information providing operation of providing the location information of the specific terminal to a network node of a user plane involved in a session of the specific terminal so that the network node is capable of using the location information when processing traffic of the session.

Specifically, in the information providing operation, the location information of the specific terminal may be provided by including the location information in a session message that transmits a rule regarding the session the specific terminal to the network node.

A terminal location information use method performed in a network device of a user plane according to an embodiment of the present disclosure includes: a confirmation operation of confirming location information of a specific terminal provided from a network node of a control plane; and a control operation of performing traffic control using the location information when processing traffic of a session of the specific terminal.

Specifically, the location information may include radio information about an access frequency of the specific terminal and area information about an access location of the specific terminal, and, in the control operation, when processing traffic of the session of the specific terminal, at least one among resource allocation scheduling, processing control, QoS control, and charging control in relation to packet processing of the traffic may be performed based on at least one of the radio information and the area information.

Advantageous Effects

Embodiments of the present disclosure may provide the effect of realizing a differentiated technology that enables UPF to differentiate and process session traffic, based on the provision of information between the control plane and the user plane, when processing the session traffic.

BRIEF DESCRIPTION OF DRAWINGS

FIG. 5 is an exemplary diagram showing a configuration in which location information defined in the present disclosure is provided (transmitted).

FIG. 6 is an exemplary diagram showing a format for providing location information in a piggyback form in the present disclosure.

MODE FOR THE INVENTION

Hereinafter, embodiments of the present disclosure will be described with reference to the accompanying drawings.

The present disclosure relates to a technology for providing information between a control plane and a user plane.

More specifically, the present disclosure relates to a technology for realizing transmission/use of information enabling UPF to differentiate and process when processing the session traffic.

Figure 1:
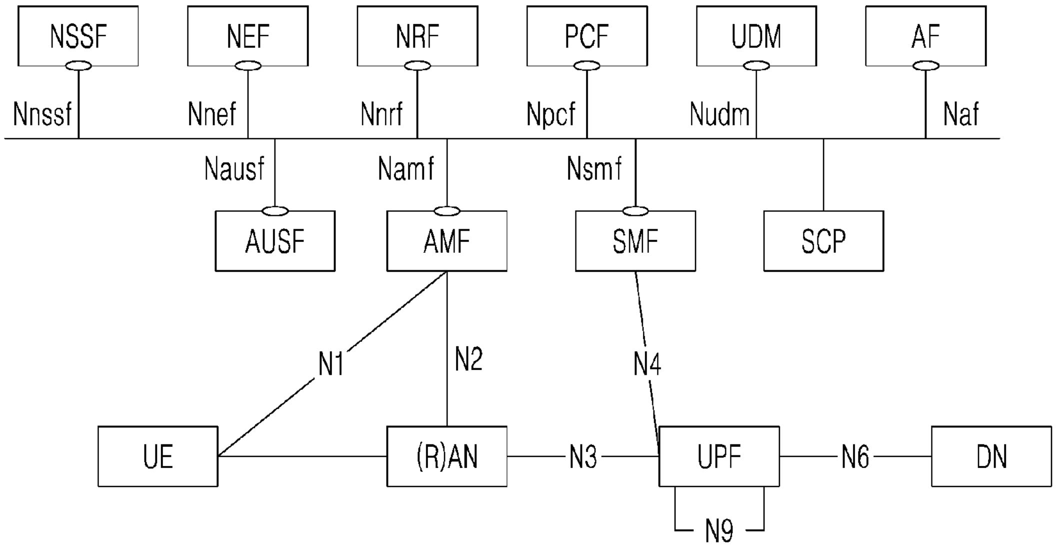
FIG. 1 is an exemplary diagram showing the structure of a 5G system.

FIG. 1 is an exemplary diagram showing the structure of a 5G system.

As can be seen in FIG. 1, a 5G communication system accommodates as many terminals as possible based on limited radio resources, and supports scenarios of enhanced mobile broadband (eMBB)/massive machine type communications (mMTC)/ultra-reliable and low latency communications (URLLC).

In particular, in 5G, a network architecture for supporting a terminal, a base station (access), a core, and a server end to end is defined.

Thus, in 5G, a control signaling function and data transmission/reception function, which were complexly performed by a single node (e.g., S-GW, P-GW, etc.) in existing LTE (4G), are separated, and a network architecture in which a control signaling function plane (a control plane) and a data transmission/reception function plane (a user plane) are distinguished is defined.

At this time, a control node of the control plane in 5G may be defined as Access and Mobility Management Function (AMF) of controlling radio section access of a terminal, Policy Control Function (PCF) of managing/controlling policies such as terminal information, subscription service information for each terminal, and charging, Session Management Function (SMF) of managing/controlling a session for data service use for each terminal, Network Exposure Function (NEF) responsible of a function of sharing information with external networks, Unified Data Management/Authentication Function (UDM/AUSF) of managing/controlling a user's subscriber DB and authentication, NF Repository Function (NRF) of managing/controlling NF repository functions, Charging Function (CHF) of handling charging on subscribers, etc.

In 5G, a data node of the user plane may be defined as a User Plane Function (UPF) of transmitting/receiving, based on the control (interworking) of the SMF, data between a terminal and a server on an external service network (e.g., Internet) through a session with the terminal.

Recently, with the activation of B2B-type/Smart Factory, each of gNB (CU) and UPF is gradually being implemented in an independent type. Due to this, there are expected requirements (e.g., detailed area/building/floor/high-importance customer/low-importance customer, etc.) by which session data of a customer (a terminal) can be differentiated/processed when processed in the UPF (independent type) which is implemented independently.

According to the current standard, in the control plane (e.g., AMF/SMF, etc.), a new UPF is selected according to information about a slice, a terminal (a user) location, and a base station, or a PDU session is established in the UPF by mapping 5G QI (QOS Flow Identity (QFI)) to the selected UPF.

As such, according to the current standard, session information provided by the SMF to the UPF is very limited to the QFI mapped to the session.

For this reason, according to the current standard, there is no information to be used to differentiate traffic in the independent-type UPF which is implemented independently, and thus it may be impossible to differentiate/process traffic when processing session traffic.

That is, in the past, in the evolution to an independent type in which the gNB (CU) and the UPF are implemented independently, session information provided by the SMF to the UPF is very limited. Therefore, the UPF cannot know location information (e.g., area/radio) of a terminal (a user), and there was no method for differentiating traffic by using the location information and processing the traffic differently.

Accordingly, an aspect of the present disclosure is to realize a technology for providing information between a control plane and a user plane and enabling UPF to differentiate and process session traffic when processing the session traffic, in consideration of an independent-type UPF implement environment.

Figure 2:
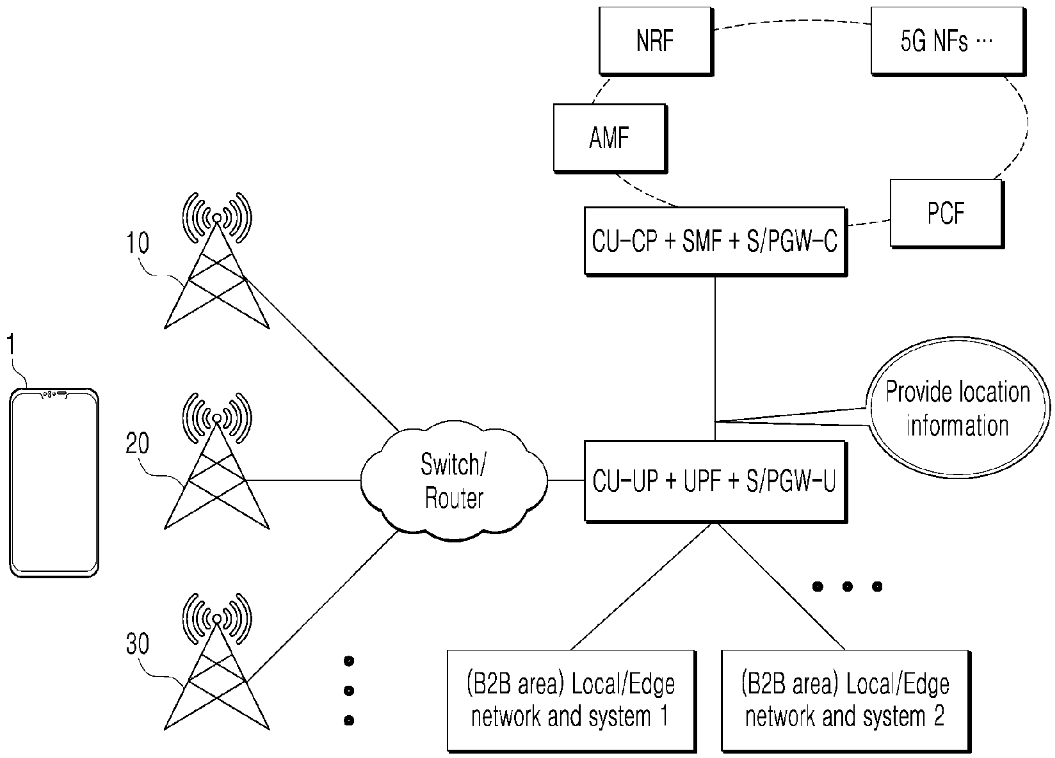
FIG. 2 is an exemplary diagram showing a scenario in which when session traffic is processed in a user plane, the traffic may be differentiated/processed by the present disclosure.

FIG. 2 is an exemplary diagram showing an example of a scenario in which when session traffic is processed in a user plane, the traffic may be differentiated/processed by the present disclosure.

As shown in FIG. 2, the core of the technology realized in the present disclosure, that is, a terminal location information providing scenario (transmission/use) lies in a configuration in which when a control plane NF (e.g., SMF) transmits location information (e.g., area/radio) of a terminal (a user) to a user plane NF, i.e., UPF, the UPF differentiates/processes traffic according to terminal area/radio when processing session traffic.

In particular, the present disclosure may be said to have a very significant feature wherein when creating/modifying a PDU session, the SMF directly transmits, through communication with the UPF, the location information of the terminal included in an N4 I/F (or Nupf SBI) according to a terminal state in the PDU session and conditions from another control plane NF.

Accordingly, the B2B-type/independent-type UPF may differentiate/process/control scheduling/processing/QoS/charging, etc. for data (session traffic) according to the detailed area/radio state of the terminal (the user).

A base station (gNB) may be divided into a central unit control plane (CU-CP) and a central unit user plane (CU-UP), the CU-CP may also be integrated with the SMF, and the CU-UP may be integrated with the UPF.

In this case, in the case of the present disclosure, the CU-CP corresponds to the aforementioned SMF as the control plane NF, and the CU-UP corresponds to the aforementioned UPF as the user plane NF. For reference, the CU-CP processes a terminal session through the CU-UP and E1 I/F.

Therefore, in the case of the present disclosure, when processing a terminal PDU session, the CU-CP may directly transmit the location information of the terminal included in the E1 I/F according to the terminal state in the PDU session and conditions from another control plane NF.

In addition, in the case of the present disclosure, assuming the integrated states of "CU-CP+SMF" and "CU-UP+UPF", E1, N4 or service-based I/F may be used to transmit the location information of the terminal.

In addition, as shown in FIG. 2, since the present disclosure considers SMF and UPF that can also accommodate NSA/LTE EPC functions, the SMF may accommodate functions of Serving Gateway/Packet Data Network Gateway Control (S/PGW-C) together, and the UPF may accommodate functions of Serving Gateway/Packet Data Network Gateway User (S/PGW-U) together.

Hereinafter, the configuration of a network device for realizing a terminal location information providing scenario (transmission/use) of the present disclosure will be described in detail with reference to FIGS. 3 and 4.

First, a network device of control plane that realizes the terminal location information providing scenario (transmission/use) of the present disclosure will be described with reference to FIG. 3.

Figure 3:
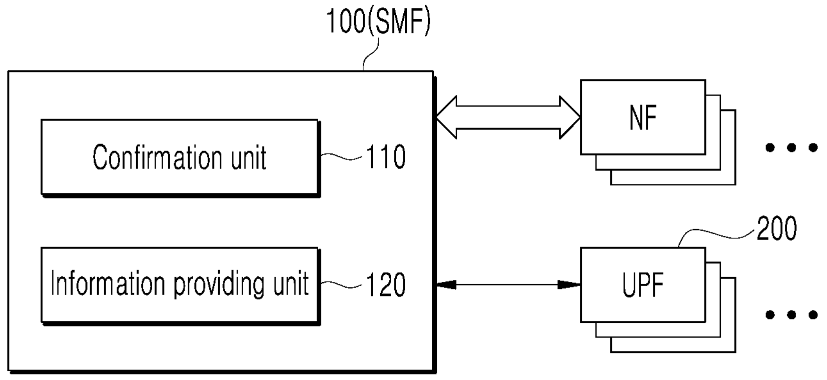
FIG. 3 is a block diagram showing the configuration of a network device according to an embodiment of the present disclosure.

As shown in FIG. 3, a network device 100 according to an embodiment of the present disclosure may include a confirmation unit 110 and an information providing unit 120.

The network device 100 may be one of network devices (or network nodes, or control nodes) of a control plane, that is, AMF, PCF, SMF, NEF, and the like.

As described above with reference to FIG. 2, in the present disclosure, the network device 100 in terms of a control plane may be CU-CP of a base station (gNB), may be CU-CP+SMF, or may be S/PGW-C, or may be CU-CP+SMF+S/PGW-C.

However, in FIG. 3 and the following description, the SMF will be described as an example for convenience of description.

Briefly, the SMF in 5G plays a role of managing/controlling a session for data service use for each terminal.

When a PDU session creation_Create event for the terminal occurs, or when a PDU session modification_Modify event or a PDU session deletion_Delete event occurs, the SMF may provide a rule including PDU session information and service requirements to at least one UPF involved in a PDU session of a terminal so that the UPF can process PDU session traffic of the terminal according to the rule.

The network device 100 (the SMF) of the present disclosure may include the confirmation unit 110 and the information providing unit 120 as elements for realizing the terminal location information providing scenario (transmission/use) of the present disclosure.

The confirmation unit 110 may play a role of confirming location information of a specific terminal.

Here, the location information to be confirmed may include, as area information about the access location of the specific terminal, at least one among Tracking Area Identity (TAI), NR Cell Global Identifier (CGI) (NCGI), E-UTRAN CGI (ECGI), GPS-based location, and access time information, and may include, as radio information about an access frequency of the specific terminal, at least one among UE Radio Capability (UE RC), frequency information, band information, and network slice (NW Slice, (SST/SD)) information.

That is, the area information included in the location information may include a Tracking Area Identity (TAI) for the access location of the specific terminal, may include one of NR CGI (NCGI) and E-UTRAN CGI (ECGI) according to a Radio Access Type (RAT Type), and furthermore, may include GPS-based location and access time information.

In addition, the radio information included in the location information may include UE Radio Capability (UE RC), frequency/band information about an access frequency of the specific terminal, and network slice (NW Slice) information.

That is, the location information may include area information and radio information that may be defined as follows.

Area information: TAI, ECGI, NCGI, GPS, Time

Radio information: UE Radio Capability, Frequency/Band information, NW Slice information Specifically, the network device 100 (SMF) of the present disclosure may obtain information about a PDU session of a terminal (a user) from another network node of the control plane, that is, another NF (e.g., AMF, NRF, PCF, CHF, UDM, AUSF, or AF).

Therefore, the network device 100 of the present disclosure may be realized by the SMF, may function as an anchor of the PDU session of the terminal (the user), may have control information such as 5G QI (QFI) as well as location information, which is the core of the present disclosure, and may combine information about the PDU session of the terminal (the user) by using the retained information.

To describe the frequency/band with respect to the access frequency of the terminal, the frequency/band may be expressed as in Table 1 below.

As can be seen in Table 1, for example, a band, nr78, is a 3.5 Ghz radio frequency, uses a total of 500 Mhz bandwidth for UL (3.3 Ghz~3.8 Ghz) and DL (3.3 Ghz~3.8 Ghz), and operates in a TDD duplex mode.

TABLE 1

| | Band Alias | Uplink (UL) Operating Band BS Receive/UE Transmit $F_{UL\_low}$-$F_{UL\_high}$ | Downlink (DL) Operating Band BS Transmit/UE Receive $F_{DL\_low}$-$F_{DL\_high}$ | Bandwidth | Duplex Mode |
|---|---|---|---|---|---|
| NR FR1 Band | | | | | |
| n1 | 2100 | 1920 MHz-1980 MHz | 2110 MHz-2170 MHz | 60 MHz | FDD |
| n2 | 1900 PCS | 1850 MHz-1910 MHz | 1930 MHz-1990 MHz | 60 MHz | FDD |
| n3 | 1800 | 1710 MHz-1785 MHz | 1805 MHz-1880 MHz | 75 MHz | FDD |
| n5 | 850 | 824 MHz-849 MHz | 869 MHz-894 MHz | 25 MHz | FDD |
| n7 | 2600 | 2500 MHz-2570 MHz | 2620 MHz-2690 MHz | 70 MHz | FDD |
| n8 | 900 | 880 MHz-915 MHz | 925 MHz-960 MHz | 35 MHz | FDD |
| n20 | 800 | 832 MHz-852 MHz | 791 MHz-821 MHz | 30 MHz | FDD |
| n28 | 700 APT | 703 MHz-748 MHz | 758 MHz-803 MHz | 45 MHz | TDD |
| n38 | TD 2600 | 2570 MHz-2620 MHz | 2570 MHz-2620 MHz | 50 MHz | TDD |
| n41 | TD 2500 | 2496 MHz-2620 MHz | 2495 MHz-2690 MHz | 194 MHz | TDD |
| n50 | TD 1500+ | 1432 MHz-1517 MHz | 1432 MHz-1517 MHz | 85 MHz | FDD |
| n51 | TD 1500− | 1427 MHz-1432 MHz | 1427 MHz-1432 MHz | 5 MHz | TDD |
| n70 | AWS-4 | 1695 MHz-1710 MHz | 1995 MHz-2020 MHz | 15/25 MHz | FDD |
| n71 | 600 | 663 MHz-698 MHz | 617 MHz-652 MHz | 35 MHz | FDD |
| n74 | L-Band | 1427 MHz-1470 MHz | 1475 MHz-1518 MHz | 43 MHz | FDD |
| n75 | DL 1500+ | N/A | 1432 MHz-1517 MHz | 85 MHz | SDL |
| n76 | DL 1500− | N/A | 1427 MHz-1432 MHz | 5 MHz | SDL |
| n77 | TD 3700 | 3300 MHz-4200 MHz | 3300 MHz-4200 MHz | 900 MHz | TDD |
| n78 | TD 3500 | 3300 MHz-3800 MHz | 3300 MHz-3800 MHz | 500 MHz | TDD |
| n79 | TD 4500 | 4400 MHz-5000 MHz | 4400 MHz-5000 MHz | 600 MHz | TDD |
| NR FR2 Band | | | | | |
| n257 | 28 GHz | 26500 MHz-29500 MHz | 26500 MHz-29500 MHz | 3000 MHz | TDD |
| n258 | 26 GHz | 24250 MHz-27500 MHz | 24250 MHz-27500 MHz | 3250 MHz | TDD |
| n260 | 39 GHz | 37000 MHz-40000 MHz | 37000 MHz-40000 MHz | 3000 MHz | TDD |

More specifically, there are various RRC activities between a terminal (hereinafter, referred to as terminal 1) and a base station (e.g., 10, 20, 30 . . . ), and when a Connection Management (CM) state changes according to the various RRC activities, state processing for the PDU session is transmitted to SMF from another control plane NF (e.g., AMF, NRF, PCF, CHF, UDM, AUSF, or AF).

The transmitted state processing includes access location which the terminal 1 has accessed, that is, base station information, for example, Tracking Area Identity (TAI), NR CGI (NCGI), E-UTRAN CGI (ECGI), and the like.

In addition, even when there is no physical location movement of the terminal 1 or change in the CM state, the latest access location of the terminal 1, that is, base station information, for example, NCGI, ECGI, TAI, etc., may be transmitted/updated to the SMF through periodic signaling.

Accordingly, the network device 100 (SMF) of the present disclosure may obtain and retain NCGI, ECGI, TAI, etc. as area information about the latest access location of a terminal of each PDU session managed/controlled by the network device 100.

The AMF in 5G transmits UE Radio Capability information received through an existing base station (e.g., 10, 20, 30 . . . ) to the SMF when creating a PDU session or when an update of the PDU session is required.

The transmitted UE radio capability information includes information about an access frequency of the terminal 1, for example, frequency/band, etc.

Accordingly, the network device 100 (SMF) of the present disclosure may obtain and retain frequency/band, etc. as radio information about the latest access frequency of the terminal of each PDU session managed/controlled by the network device 100.

Hereby, the network device 100 (SMF) of the disclosure, in particular, the confirmation unit 110, may confirm location information (area information/radio information) of a specific terminal, based on the base station information (e.g., NCGI, ECGI, TAI, etc.) and the UE Radio Capability information (e.g., frequency/band, etc.) for each terminal/for each PDU session, which can be obtained and updated/retained as described above.

The location information defined in the present disclosure may include TAC in addition to the aforementioned area information (NCGI, ECGI, TAI, etc.) and radio information (frequency/band, etc.), may also include a network slice (NW Slice (SST/SD)), and may also include GPS-based location (latitude and longitude) of the terminal (UE), and SUPI, PEI, IMSI, and phone number of the terminal.

The information providing unit 120 may play a role of providing the location information of the specific terminal to a network node of a user plane involved in a session of the specific terminal so that the location information can be used when the network node processes traffic of the session.

That is, the information providing unit 120 plays a role of providing (transmitting) the above-described location information of the specific terminal (hereinafter, referred to as "terminal 1") confirmed by confirmation unit 110 to one or more UPFs involved in the PDU session of terminal 1.

Hereinafter, a specific embodiment of a method of transmitting (providing) location information of a terminal will be described.

According to an embodiment, the information providing unit 120 may include the location information (area information/radio information) of the terminal 1 confirmed by the confirmation unit 110 in a session message that transfers the rule regarding a PDU session of the specific terminal, that is, the terminal 1 described as an example above, to one or more UPFs involved in the PDU session of the terminal 1, and may provide (transmit) the location information (area information/radio information) of the terminal 1.

Here, the session message, that is, the PDU session message, may include a PDU Session Establish (or Creation)/Modification/Deletion message, etc.

That is, the information providing unit 120 may provide (transmit) the location information (area information/radio information) of the terminal 1 to UPF involved in the PDU session of the terminal 1 in a manner in which when transmitting a PDU session message based on N4 I/F (or Nupf SBI), the location information (area information/radio information) of the terminal 1 is included in the PDU session message and transmitted.

In addition, the PDU session message includes the rule regarding the PDU session of the terminal 1, that is, Packet Detection Rule (PDR) (e.g., matching based on IP address), Forward Action Rule (FAR) (e.g., determining whether to forward), QoS Enforcement Rule (QER) (e.g., performing gating/rating), or Usage Reporting Rule (URR) (e.g., performing quota/usage).

FIG. 5 is an exemplary diagram showing a configuration in which location information (area information/radio information) in the present disclosure is provided (transmitted).

As shown in FIG. 5, in the present disclosure, during creation/modification/deletion of a PDU session of terminal 1, a rule (e.g., PDR, QER, FAR, or URR) is provided (transmitted) to a related UPF, while location information (area information/radio information, that is, NCGI, ECGI, Freq/Band, GPS, Time, etc. in FIG. 5) is provided (transmitted) together with the rule.

In addition, as shown in FIG. 5, in the present disclosure, when there are multiple PDU sessions of one terminal 1, location information (area information/radio information, that is, NCGI, ECGI, Freq/Band, GPS, Time, etc. in FIG. 5) may be provided (transmitted) together with the rule for each PDU session (e.g., PDU Session ID).

As such, the network device 100 (SMF) of the present disclosure may provide (transmit) the location information (area information/radio information) of the terminal 1 to a related UPF by using a PDU session message that transmits a related rule to the related UPF when creating/modifying/deleting a PDU session of the terminal 1, and thus may not trigger additional signaling for location information transmission.

Furthermore, the information providing unit 120 may provide (transmit) the location information (area information/radio information) of the specific terminal, for example, the terminal 1, in the form of piggyback that utilizes a specific Information Element (IE) format to transmit information in signaling of an interface, that is, N4 I/F (or Nupf SBI), which supports direct signaling between SMF and UPF.

FIG. 6 is an exemplary diagram showing a format for providing location information in a piggyback form according to an embodiment of the present disclosure.

In N4 I/F signaling between SMF and UPF, for example, Packet Forwarding Control Protocol (PFCP) signaling, an IE format for transmitting a UE ID and a UE IP address is defined.

In the present disclosure, location information (area information/radio information) of terminal 1 may be provided (transmitted) to a related UPF in a form, i.e., a piggyback form, in which a UE ID IE or UE IP Address IE format defined in the standard is used to put the location information (area information/radio information) in each field of a UE ID IE or a UE IP Address IE.

FIG. 6 shows, as an example, the case in which location information (area information/radio information) is configured/transmitted using the UE ID IE or UE IP Address IE format in a PDU session message (or a PFCP session creation message) of PDU Session Establish (or Creation).

In this case, in providing (transmitting) the location information (area information/radio information) of the terminal 1 to the related UPF when creating/modifying/deleting a PDU session of the terminal 1, the network device 100 (SMF) of the present disclosure may not trigger additional signaling for location information transmission, and may very effectively transmit the location information (area information/radio information) by using the existing PFCP (N4 I/F) signaling as it is.

Furthermore, the information providing unit 120 may selectively provide (transmit) the location information (are information/radio information) of a specific terminal, for example, the terminal 1, according to a specific condition in consideration of the signaling state of an interface, for example, N4 I/F (or Nupf SBI), which supports direct signaling between SMF and UPF.

The signaling state may include the load (overload status) and performance (throughput, latency, and TPS) of the corresponding interface (e.g., N4 I/F (or Nupf SBI)).

In addition, the specific condition may be configured to be the case in which multiple or more preconfigured pieces of individual area information/radio information in the network device 100 (SMF) of the present disclosure are changed, or the case in which at least one piece or N pieces of area information (e.g., NCGI, ECGI, TAI, etc.) in the location information of the terminal are changed.

For example, at least one or N pieces of area information (e.g., NCGI, ECGI, TAI, etc.) within the location information of the terminal 1 may be changed, or multiple pieces of individual area information and/or radio information may be repeatedly changed/updated.

Accordingly, in consideration of the signaling state of N4 I/F (or Nupf SBI) and the change/update situation of area information/radio information, when at least one or N pieces of area information (e.g., NCGI, ECGI, TAI, etc.) in the location information of the terminal 1 are changed, or when multiple pieces of area information and/or radio information are repeatedly changed, the network device 100 (SMF) of the present disclosure may collect the information, and may include the collected information in one N4 session in a piggyback form when the signaling state is good (e.g., when the load/performance satisfy conditions) and may transmit the information to the UPF.

In the terminal location information providing scenario (transmission/use) of the present disclosure, an operation of providing (transmitting) the terminal location information to the UPF may be performed only a specific terminal that satisfies a predetermined information providing condition.

For example, the network device 100 (SMF) of the present disclosure, in particular, the confirmation unit 110 may confirm the above-described location information (area information/radio information) with respect to the specific terminal, which satisfies the preconfigured information providing condition, based on at least one of the state of the terminal and a condition from another network node, that is, another NF (e.g., AMF, NRF, UDM, PCF. NEF, NSSF, etc.) of a control plane.

Accordingly, the network device 100 (SMF), in particular, the information providing unit 120 may conditionally operate the terminal location information providing scenario (transmission/use) of the present disclosure by providing (transmitting) the location information (area information/radio information), confirmed by the confirmation unit 110 only with respect to the specific terminal satisfying the information providing condition, to the related UPF through the N4 I/F (or Nupf SBI) in the same manner as described above.

Hereinafter, an embodiment in which the terminal location information providing scenario (transmission/use) of the present disclosure is conditionally operated will be described.

Describing an embodiment, the network device 100 (SMF) of the present disclosure, in particular, the confirmation unit 110 may recognize, based on a subscriber profile-based condition from another NF (e.g., UDM), a specific subscriber (a user) as a specific terminal satisfying an information providing condition to confirm location information (area information/radio information).

In addition, the confirmation unit 110 may confirm location information (area information/radio information) by recognizing a specific subscriber (a user) as a specific terminal during QoS control based on a condition from another NF (e.g., PCF), recognizing a specific subscriber (a user) as a specific terminal when charging the specific subscriber (the user) based on a condition from another NF (e.g., CHF), or recognizing a specific subscriber as a specific terminal at the time of exposure to a 3rd party at the outside thereof, based on conditions from other NFs (e.g., NEF).

In the present disclosure, in addition to the above-described conditions from other NFs and a specific terminal recognition method based on the conditions, various conditions may be configured through interworking with other NFs, and triggering recognition of a specific terminal, the location information (area information/radio information) of which is to be confirmed, may be employed according to the conditions, so as to implement various types of scenario in which the terminal location information providing scenario (transmission/use) of the present disclosure is conditionally operated.

That is, specific examples of triggering recognition conditions may include the occurrence of specific control events such as location information of a terminal, information about entry into/exit from a specific area, and terminal handover, or the case in which QoS state (RSRP, RSRQ, or Radio Resource Block) of a terminal, the terminal's service performance (e.g., throughput, latency, or jitter) is above or below a specific threshold, or the case in which multiple complex conditions are satisfied.

Describing another embodiment, the network device 100 (SMF) of the present disclosure, in particular, the confirmation unit 110 the confirmation unit 110 may recognize, based on the state of terminals, a terminal in which a specific state has occurred (hereinafter, Procedure/Event) as a specific terminal satisfying an information providing condition, and may confirm location information (area information/radio information).

The specific state, that is, Procedure/Event may include Initial Registration, User In/Activity, Service Request, Xn Handover, Periodic Registration Update, N2 Handover, Deregistration, etc.

As described above, according to the network device 100 of the present disclosure, a control plane NF (e.g., SMF) may transmit location information (e.g., area/radio) of the terminal (the user) to a user plane NF, that is, UPF.

According to the present disclosure described above, when the network device 100 of the present disclosure is CU-CP, the CU-CP of the control plane will transmit the location information (e.g., area/radio) of the terminal (the user) to a user plane NF, that is, CU-UP, through E1 I/F by using a piggyback form based on an IE format suitable therefor.

In addition, when the network device 100 of the present disclosure in FIG. 3 is S/PGW-C, the S/PGW-C of the control plane will transmit the location information (e.g., area/radio) of the terminal (the user) to a user plane NF, that is, S/PGW-U, through Sx I/F by using a piggyback form based on an IE format suitable therefor.

Next, a network device of a user plane for realizing a terminal location information providing scenario (transmission/use) of the present disclosure will be described with reference to FIG. 4.

Figure 4:
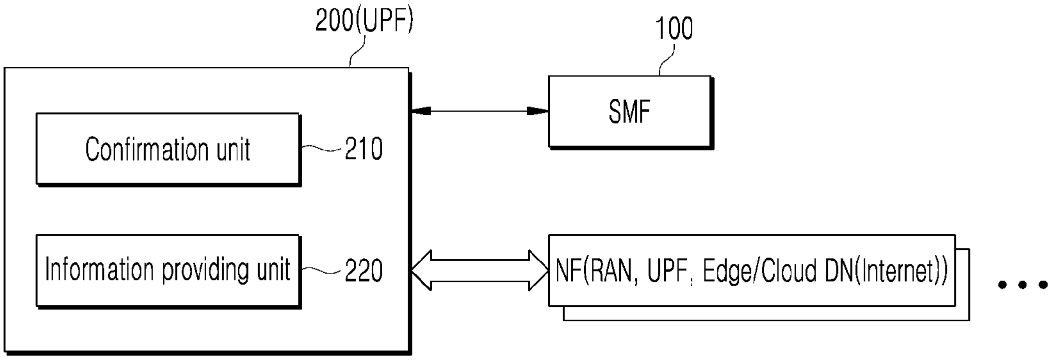
FIG. 4 is a block diagram showing the configuration of a network device according to an embodiment of the present disclosure.

As shown in FIG. 4, a network device 200 according to an embodiment of the present disclosure may include a confirmation unit 210 and a controller 220.

As described above with reference to FIG. 2, in the present disclosure, the network device 200 in terms of a user plane may be a network device (or network node, or data node) of the user plane, that is, UPF.

As described above with reference to FIG. 2, in the present disclosure, the network device 200 in terms of a control plane may be CU-UP of a base station (gNB), may be CU-UP+UPF, may be S/PGW-U, or may be CU-UP+UPF+S/PGW-U.

However, in FIG. 4 and the following description, the UPF will be described as an example for convenience of description.

Briefly, the UPF in 5G plays roles of control a PDU session of a terminal based on control (interlocking) of the SMF 100, and transmitting and receiving data between the terminal and a node (e.g., an Internet server, an Edge server, etc.) through the PDU session of the terminal.

That is, the UPF receives a rule (PDR/QER/FAR/URR) including PDU session information and service requirements from the SMF 100, and processes PDU session traffic of the terminal according to the rule.

In particular, according to the terminal location information providing scenario (transmission/use) of the present disclosure, the UPF may receive, from the SMF, location information (area information/radio information) of the terminal in addition to the rule (e.g., PDR/QER/FAR/URR) regarding the PDU session, and thus may very efficiently differentiate/process/control scheduling/processing/QoS/charging, etc. for data (session traffic) according to the detailed area/radio state of the terminal (the user).

The network device 200 (UPF) of the present disclosure may include the confirmation unit 210 and the controller 220 as elements for realizing the terminal location information providing scenario (transmission/use) of the present disclosure.

The confirmation unit 210 may play a role of confirming location information of a specific terminal provided from a network node of a control plane.

Here, the network device 200 (UPF) of the present disclosure may receive the location information of the specific terminal from various control plane NFs, such as SMF, AMF, PCF, CHF, UDM, and AF. However, in the following description, for convenience, the case in which the location information of the specific terminal is provided from the SMF and received/confirmed will be described.

That is, the confirmation unit 210 may receive/confirm the location information of the specific terminal (hereinafter, referred to as "terminal 1") provided from the SMF.

As described in detail above, the location information may include NCGI, ECGI, TAI, etc. as area information about the access location of the specific terminal, and may include frequency information, band information, etc. as radio information about the access frequency of the specific terminal.

In addition, as described in detail with reference to FIGS. 5 and 6 above, the network device 200 (UPF) of the present disclosure may receive the location information (area information/radio information) of the terminal 1 provided (transmitted) through a PDU session message through which a related rule is received from the SMF during PDU session creation/modification/deletion for the terminal 1, and may receive the location information (area information/radio information) of the terminal 1 provided (transmitted) by using an IE format of the existing PFCP (N4 I/F) signaling in a piggyback form.

The controller 220 plays a role of performing traffic control by using the location information (area information/radio information) confirmed by the confirmation unit 210 when processing traffic of a PDU session of the specific terminal, for example, the terminal 1.

That is, when processing traffic of the PDU session of the specific terminal, for example, the terminal 1, the controller 220 may perform at least one of resource allocation scheduling, processing control, QoS control, and charging control in relation to traffic packet processing, based on at least one of the radio information (e.g., frequency information, band information, etc.) and the area information (e.g., NCGI, ECGI, TAI, etc.) in the location information of the terminal 1.

More specifically, an embodiment in which the network device 200 (UPF) of the present disclosure performs traffic control using location information (area information/radio information) will be described below.

According to an embodiment, when processing PDU session data of the terminal 1, the controller 220 may perform resource allocation scheduling based on the radio information (e.g., frequency information, band information, etc.) in the location information of the terminal 1.

For example, service frequencies for base stations 10, 20, 30, . . . shown in FIG. 2 may be different (e.g., 28 Ghz, 3.5 Ghz, and 1.8 Gh (LTE), . . . ), and the network device 200 (UPF) of the present disclosure may differentiate and process allocation scheduling of resources to be allocated to packet processing for each frequency.

Accordingly, when processing traffic of the PDU session of the terminal 1, the controller 220 may guarantee clear resource allocation based on the radio information (e.g., frequency information, band information, etc.) in the location information of the terminal 1.

For example, the controller 220 may allocate a resource to N3 uplink (base station→UPF) for entrance into the network device 200 (UPF) of the present disclosure in resources (CPU/Memory/Disk) secured by mapping with the radio information in the location information of the terminal 1, and may use a QFI field (a GTPu header included in N3) together at this time.

The controller 220 may also allocate a resource to N6 downlink (Internet→UPF) for entrance into the network device 200 (UPF) of the present disclosure in resources (CPU/Memory/Disk) secured by mapping with the radio information in the location information of the terminal 1, and may also use a DSCP field (a field included in an IP packet) together at this time.

When processing traffic of the PDU session of the terminal 1, the controller 220 may also guarantee clear resource allocation according to the same method as described above, based on the area information (e.g., NCGI, ECGI, TAI, etc.) in the location information of the terminal 1.

When processing traffic of the PDU session of terminal 1, the controller 220 may also guarantee clear resource allocation according to the same method as described above, based on a combination of the area information (e.g., NCGI, ECGI, TAI, etc.) and the radio information (e.g., frequency information, band information, etc.) in the location information of the terminal 1.

According to another embodiment, when processing PDU session data of the terminal 1, the controller 220 may perform processing control based on the area information (e.g., NCGI, ECGI, TAI, etc.) of the terminal 1.

For example, the controller 220 may perform, based on the area information (e.g., NCGI, ECGI, TAI, etc.) of the terminal 1, process control over Forwarding, Steering, or Routing according to a method for determining an IP address change (NAT/Firewall) of a destination in order to transmit traffic (packet) of the PDU session of the terminal 1 to an Edge server rather than an Internet server or, conversely, to the Internet server rather than the Edge server.

When processing traffic of the PDU session of the terminal 1, the controller 220 may also perform processing control over Forwarding, Steering, or Routing according to the same method as described above, based on a combination of the area information (e.g., NCGI, ECGI, TAI, etc.) and the radio information (e.g., frequency information, band information, etc.) in the location information of the terminal 1, or based on the radio information (e.g., frequency information, band information, etc.).

According to another embodiment, when processing traffic of the PDU session of the terminal 1, the controller 220 may also perform QoS control, charging control, etc. based on the area information (e.g., NCGI, ECGI, TAI, etc.) of the terminal 1.

For example, the controller 220 may perform QoS control based on the area information (e.g., NCGI, ECGI, TAI, etc.) of the terminal 1 by determining a QoS change applied to traffic of the PDU session of the terminal 1.

Alternatively, the controller 220 may perform charging control based on the area information (e.g., NCGI, ECGI, TAI, etc.) of the terminal 1 by changing a charging method applied to traffic of the PDU session of the terminal 1 or by applying split charging to traffic corresponding to the aforementioned processing control over Forwarding, Steering, or Routing.

The controller 220 may also perform the aforementioned QoS control and charging control, based on a combination of the area information (e.g., NCGI, ECGI, TAI, etc.) and the radio information (e.g., frequency information, band information, etc.) in the location information of the terminal 1, or based on radio information (e.g., frequency information, band information, etc.).

If necessary, the network device 200 (UPF) of the present disclosure may transmit control-related matters (e.g., IP address change, QoS change, charging change, etc.), determined when performing the aforementioned resource allocation scheduling/processing control/QoS control/charging control, to a related NF (e.g., SMF, etc.) of a control plane so that the aforementioned resource allocation scheduling/processing control/QoS control/charging control are reflected by the control plane.

As described above, according to the network devices 100 and 200 of the present disclosure, the user plane NF (e.g., UPF, CU-UP, S/PGW-U, CU-UP+UPF, or CU-UP+UPF+S/PGW-U) may secure/use the location information (e.g., area/radio) of the terminal (the user) from the control plane to differentiate/process traffic according to the terminal area/radio.

The present disclosure may have an effect of realizing a differentiated technology that enables UPF to further differentiate and process session traffic, based on the provision of information between the control plane and the user plane, when processing the session traffic.

Hereinafter, a method for realizing a terminal location information providing scenario (transmission/use) of the present disclosure will be described in detail with reference to FIG. 7.

Prior to the description, an embodiment in which SMF of a control plane or UPF of a user plane is referred to as a network device (NF) according to the present disclosure in FIG. 7 will be described.

Figure 7:
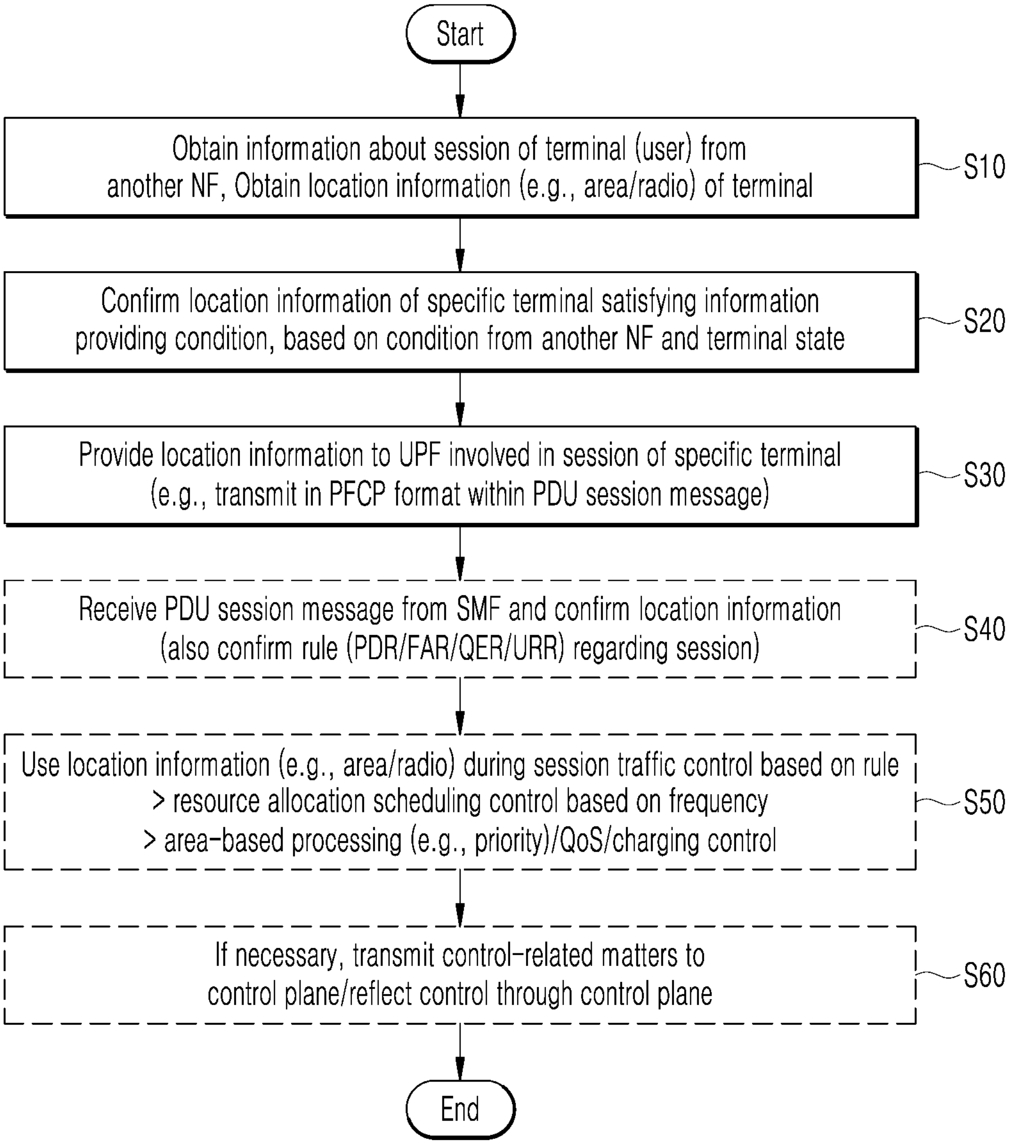
FIG. 7 is a flowchart illustrating a terminal location information transmission method and use terminal location information and a terminal location information use method performed by a network device according to an embodiment of the present disclosure.

For convenience of description, in FIG. 7, a terminal location information transmission method performed by an NF (e.g., SMF) of the control plane is shown with a solid line, and is performed in the NF (e.g., UPF) of the user plane, and a terminal location information use method performed by an NF (e.g., UPF) of the user plane is shown with a dotted line.

According to the terminal location information transmission method of the present disclosure, the network device 100 (SMF) may obtain information about a PDU session of a terminal (a user) from another NF (e.g., AMF, NRF, PCF, CHF, UDM, AUSF, or AF) of a control plane (S10).

The network device 100 (SMF) receives state processing for a PDU session from the other NF (e.g., AMF, NRF, PCF, CHF, UDM, AUSF, or AF) of the control plane when a Connection Management (CM) state changes according to various RRC activities between the terminal (hereinafter, referred to as terminal 1) and a base station (e.g., 10, 20, 30, . . . ).

The transmitted state processing includes an access location to which the terminal 1 has accessed, i.e., base station information, for example, NR Cell Global Identifier (CGI) (NCGI), E-UTRAN CGI (ECGI), Tracking Area Identity (TAI), etc.

In addition, even when there is no physical location movement of the terminal 1 or no change in the CM state, the latest access location of the terminal 1, that is, base station information, for example, NCGI, ECGI, TAI, etc., may be transmitted/updated to the SMF through periodic signaling.

Accordingly, the network device 100 (SMF) of the present disclosure may obtain and retain NCGI, ECGI, TAI, etc. as area information about the latest access location of a terminal of each PDU session managed/controlled by the network device 100 (S10).

The AMF in 5G transmits UE Radio Capability information received through an existing base station (e.g., 10, 20, 30 . . . ) to the SMF when creating a PDU session or when an update of the PDU session is required.

The transmitted UE radio capability information includes information about an access frequency of the terminal 1, for example, frequency/band, etc.

Accordingly, the network device 100 (SMF) of the present disclosure may obtain and retain frequency/band, etc. as radio information about the latest access frequency of the terminal of each PDU session managed/controlled by the network device 100 (S10).

According to the terminal location information transmission method of the present disclosure, the network device 100 (SMF) may confirm the above-described location information (area information/radio information) with respect to a specific terminal, which satisfies a preconfigured information providing condition, based on at least one of the state of the terminal and a condition from another NF (e.g., UDM, PCF, NEF, NRF, NSSF, etc.) of a control plane (S20).

That is, the network device 100 (SMF) of the present disclosure may conditionally confirm location information (area information/radio information) only with respect to a specific terminal/specific PDU session for which the preconfigured information providing condition is satisfied.

According to the terminal location information transmission method of the present disclosure, the network device 100 (SMF) provides (transmits) the location information of the specific terminal (hereinafter, referred to as terminal 1) confirmed in operation S20 to one or more related UPFs involved in a PDU session of terminal 1 (S30).

Specifically, the network device 100 (SMF) of the present disclosure may include the location information (area information/radio information) of the terminal 1 in a session message that transfers a rule regarding the PDU session of the specific terminal, that is, the terminal 1 described as an example above, to one or more UPFs involved in the PDU session of the terminal 1, and may provide (transmit) the location information (area information/radio information) of the terminal 1 (S30).

Here, the session message, that is, a PDU session message, may include a PDU Session Establish (or Creation)/Modification/Deletion message, etc.

In addition, the PDU session message includes the rule regarding the PDU session of the terminal 1, that is, Packet Detection Rule (PDR) (e.g., matching based on IP address), Forward Action Rule (FAR) (e.g., determining whether to forward), QoS Enforcement Rule (QER) (e.g., performing gating/rating), or Usage Reporting Rule (URR) (e.g., performing quota/usage).

Furthermore, the network device 100 (SMF) of the present disclosure may provide (transmit) the location information (area information/radio information) of the specific terminal, for example, the terminal 1, in the form of piggyback that utilizes a specific Information Element (IE) (e.g., UE ID IE or UE IP Address IE) format to transmit information in signaling of an interface, that is, N4 I/F (or Nupf SBI), which supports direct signaling between SMF and UPF (S30).

Furthermore, when at least one or N pieces of area information (e.g., NCGI, ECGI, TAI, etc.) in the location information of the terminal 1 are changed, or when multiple pieces of area information and/or radio information are repeatedly changed, the network device (e.g., AMF/SMF) of the present disclosure may collect the information, may include the collected information in one N4 session in a piggyback form, and may transmit the information to the UPF.

In providing (transmitting) the location information (area information/radio information) of the terminal 1 to the related UPF when creating/modifying/deleting a PDU session of the terminal 1, the network device 100 (SMF) of the present disclosure may not trigger additional signaling for location information transmission, and may very effectively transmit the location information (area information/radio information) by using the existing PFCP (N4 I/F) signaling as it is.

According to the terminal location information use method of the present disclosure, the network device 200 (UPF) may receive/confirm location information of a specific terminal (hereinafter, referred to as terminal 1) provided from a control plane NF, for example, SMF (S40).

Referring to the above description and FIGS. 5 and 6, the network device 200 (UPF) of the present disclosure may receive the location information (area information/radio information) of the terminal 1 provided (transmitted) through a PDU session message through which a related rule is received from SMF during creation/modification/deletion of a PDU session of the terminal 1, and may receive and confirm the location information (area information/radio information) of the terminal 1 provided (transmitted) by using an IE format of the existing PFCP (N4 I/F) signaling in a piggyback form.

The network device 200 (UPF) of the present disclosure receives a rule (PDR/QER/FAR/URR) including PDU session information and service requirements from the SMF through the PDU session message, and processes PDU session traffic of the terminal 1 according to the rule (S50).

According to the terminal location information use method of the present disclosure, when processing traffic of the PDU session of the terminal 1, the network device 200 (UPF) may perform at least one of resource allocation scheduling, processing control, QoS control, and charging control in relation to traffic packet processing, based on at least one of the radio information (e.g., frequency information, band information, etc.) and the area information (e.g., NCGI, ECGI, TAI, etc.) in the location information of the terminal 1 (S50).

According to an embodiment, when processing PDU session data of the terminal 1, the network device 200 (UPF) may perform resource allocation scheduling based on the radio information (e.g., frequency information, band information, etc.) in the location information of the terminal 1.

According to another embodiment, when processing PDU session data of the terminal 1, the network device 200 (UPF) may perform processing control (e.g., priority), QoS control, charging control, etc., based on the area information (e.g., NCGI, ECGI, TAI, etc.) of the terminal 1.

According to the terminal location information use method of the present disclosure, if necessary, the network device 200 (UPF) may transmit control-related matters (e.g., IP address change, QoS change, charging change, etc.), determined when performing the aforementioned resource allocation scheduling/processing control/QoS control/charging control in operation S50, to a related NF (e.g., SMF, etc.) of a control plane so that the aforementioned resource allocation scheduling/processing control/QoS control/charging control are reflected by the control plane (S60).

As described above, the core of the present disclosure lies in a configuration in which when a control plane NF (e.g., SMF) transmits location information (e.g., area/radio) of a terminal (a user) to a user plane NF, i.e., UPF, the UPF differentiates/processes traffic according to terminal area/radio when processing session traffic.

In particular, the present disclosure may be said to have a very significant feature wherein when creating/modifying a PDU session, the SMF directly transmits, through communication with the UPF, the location information of the terminal included in an N4 I/F (or Nupf SBI) according to a terminal state in the PDU session and conditions from another control plane NF.

Accordingly, the B2B-type/independent-type UPF may differentiate/process/control scheduling/processing/QoS/charging, etc. for data (session traffic) according to the detailed area/radio state of the terminal (the user).

The present disclosure has an effect of realizing a differentiated technology that enables UPF to further differentiate and process, based on the provision of information between the control plane and the user plane, when processing the session traffic.

Methods for transmitting and using terminal location information according to an embodiment of the present disclosure may be implemented in the form of program commands capable of being executed through various computer means, and may be recorded in a computer-readable medium. The computer-readable medium may include a program command, a data file, a data structure, etc. alone or in combination. The program commands recorded in the medium may be specially designed and configured for the present disclosure, or may be known and usable to those skilled in the art of computer software. Examples of the computer-readable recording media include magnetic media such as hard disks, floppy disks and magnetic tapes, optical media such as CD-ROMs and DVDs, and magneto-optical media such as floptical disks, and hardware devices specially configured to store and execute program commands, such as ROM, RAM, flash memory, and the like. Examples of program commands include high-level language codes that can be executed by a computer using an interpreter, as well as machine language codes such as those produced by a compiler. The hardware devices may be configured to act as one or more software modules to perform the operations of the present disclosure, and vice versa.

Although the present disclosure has been described in detail with reference to various embodiments so far, the present disclosure is not limited to the above embodiments. The technical spirit of the present disclosure will reach various changes or modifications which are capable of being made by those skilled in the art, to which the present disclosure belongs, without departing from the subject matter of the present disclosure claimed in the following claims.

The invention claimed is:

1. A network device of a control plane, the network device comprising:

a non-transitory memory to store instructions; and a processor configured to execute one or more of the instructions to:

confirm location information of a specific terminal; and provide the location information of the specific terminal to a network node of a user plane associated with a session of the specific terminal, wherein the location information of the specific terminal is used by the network node of the user plane to differentiate and process traffic of the session according to at least one of area information or radio information of the specific terminal.

2. The network device of claim 1, wherein the location information comprises at least one of tracking area identity (TAI), NR cell global identifier (NCGI), E-UTRAN CGI (ECGI), GPS-based location, or access time information as the area information about an access location of the specific terminal.

3. The network device of claim 1, wherein the location information comprises at least one of UE radio capability (UE RC), frequency information, band information, or network slice (NW slice) information as the radio information about an access frequency of the specific terminal.

4. The network device of claim 1, wherein the processor unit is further configured to provide the location information of the specific terminal by including the location information in a session message for transmitting a rule regarding the session of the specific terminal to the network node.

5. The network device of claim 1, wherein the network device is a network node having an interface configured to support direct signaling to the network node in a control plane, and the processor is further configured to selectively provide the location information of the specific terminal according to a specific condition in consideration of a signaling state of the interface.

6. The network device of claim 1, wherein the processor is further configured to confirm the location information with respect to the specific terminal satisfying a preconfigured information providing condition, based on at least one of a condition from another network node of the control plane or a state of the terminal.

7. A network device of a user plane, the network device comprising:

a non-transitory memory to store instructions; and a processor configured to execute one or more of the instructions to:

confirm location information of a specific terminal provided from a network node of a control plane; and perform traffic control by differentiating and processing traffic of a session of the specific terminal according to at least one of area information or radio information of the specific terminal by using the location information.

8. The network device of claim 7, wherein the location information comprises the radio information about an access frequency of the specific terminal and the area information about an access location of the specific terminal, and the processor is further configured to perform at least one of resource allocation scheduling, processing control, QoS control, or charging control in relation to packet processing of the traffic based on at least one of the radio information or the area information.

9. A terminal location information transmission method performed by a network device of a control plane, the method comprising:

confirming location information of a specific terminal; and providing the location information of the specific terminal to a network node of a user plane associated with a session of the specific terminal, wherein the location information of the specific terminal is used by the network node of the user plane to differentiate and process traffic of the session according to at least one of area information or radio information of the specific terminal.

10. The method of claim 9, wherein the providing comprises:

including the location information in a session message for transmitting a rule regarding the session of the specific terminal to the network node for providing the location information of the specific terminal.

11. A terminal location information use method performed by a network device of a user plane, the method comprising:

confirming location information of a specific terminal provided from a network node of a control plane; and controlling to perform traffic control by differentiating and processing traffic of a session of the specific terminal according to at least one of area information or radio information of the specific terminal by using the location information.

12. The method of claim 11, wherein the location information comprises the radio information about an access frequency of the specific terminal and the area information about an access location of the specific terminal, and, the controlling comprises performing at least one of resource allocation scheduling, processing control, QoS control, or charging control in relation to packet processing of the traffic based on at least one of the radio information or the area information.

* * * * *